United States Patent
Chen et al.

(10) Patent No.: US 9,847,727 B1
(45) Date of Patent: Dec. 19, 2017

(54) HALF-BRIDGE RESONANT BIDIRECTIONAL DC-DC CONVERTER CIRCUIT HAVING A HALF-BRIDGE BUCK-BOOST CONVERTER AND A RESONANT DC-DC CONVERTER

(71) Applicant: NATIONAL CHUNG SHAN INSTITUTE OF SCIENCE AND TECHNOLOGY, Taoyuan (TW)

(72) Inventors: Kun-Feng Chen, Taoyuan (TW); Hsuang-Chang Chiang, Miaoli County (TW); Rong-Yang Wang, Taoyuan (TW); Chin-Yu Ho, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 0 days.

(21) Appl. No.: 15/364,133

(22) Filed: Nov. 29, 2016

(51) Int. Cl.
*H02M 3/335* (2006.01)

(52) U.S. Cl.
CPC .... *H02M 3/33507* (2013.01); *H02M 3/33523* (2013.01)

(58) Field of Classification Search
CPC ............... H02M 3/33507; H02M 3/33523
See application file for complete search history.

(56) References Cited

U.S. PATENT DOCUMENTS

| | | | | |
|---|---|---|---|---|
| 9,419,514 | B1* | 8/2016 | Xiong | H02M 1/4208 |
| 2009/0122578 | A1* | 5/2009 | Beltran | H02M 3/33507 |
| | | | | 363/16 |
| 2013/0119888 | A1* | 5/2013 | Elferich | H02M 1/4258 |
| | | | | 315/291 |
| 2013/0127358 | A1* | 5/2013 | Yao | H05B 33/0815 |
| | | | | 315/201 |
| 2015/0263634 | A1* | 9/2015 | Fu | H02M 3/33569 |
| | | | | 363/21.02 |
| 2015/0333635 | A1* | 11/2015 | Yan | H02M 3/3376 |
| | | | | 363/17 |
| 2016/0094136 | A1* | 3/2016 | Fu | H02M 3/1582 |
| | | | | 363/21.02 |

* cited by examiner

*Primary Examiner* — Jue Zhang
*Assistant Examiner* — Lakaisha Jackson
(74) *Attorney, Agent, or Firm* — WPAT, P.C.; Anthony King

(57) ABSTRACT

A half-bridge resonant bidirectional DC-DC converter circuit comprising a half-bridge buck-boost converter and a resonant DC-DC converter. The half-bridge buck-boost converter is coupled to an external DC power source to achieve a wide input voltage range. The resonant DC-DC converter is coupled to the half-bridge buck-boost converter to act as a later stage circuit of the half-bridge buck-boost converter. The resonant DC-DC converter is used to control the direction of the bidirectional power flow and respond to the half-bridge buck-boost converter under a fixed frequency mode to convert the input of the half-bridge buck-boost converter to an induced current.

8 Claims, 11 Drawing Sheets

US 9,847,727 B1

HALF-BRIDGE RESONANT BIDIRECTIONAL DC-DC CONVERTER CIRCUIT HAVING A HALF-BRIDGE BUCK-BOOST CONVERTER AND A RESONANT DC-DC CONVERTER

FIELD OF THE INVENTION

The present invention discloses a DC-DC converter circuit and more particularly discloses a half-bridge resonant bidirectional DC-DC converter circuit.

BACKGROUND OF THE INVENTION

In the case of high voltage conversion ratios or where isolation requirements are required, bidirectional DC-DC converter circuits with function of isolation must be employed. The known circuit architectures include dual active full-bridged converter, LLC-SRC converter, two-stage series-connected converter and phase-shifted full-bridge converter using push-pull current source.

As shown in FIG. 1, the principle of the dual active full-bridged converter is to use the phase shift of the first-order side and second-order side to control its power flow direction.

As shown in FIG. 2, the LLC-SRC converter circuit architecture is composed of LLC resonant circuit and SRC (series) resonant circuit. The power flow of the bidirectional power is controlled by using a frequency conversion method. The shortcoming of this circuit is that the frequency variation range will increase with the increase of the operating voltage and is more difficult to control at low power.

As shown in FIG. 3 and FIG. 4, FIG. 3 and FIG. 4 respectively show that the later stage circuit in FIG. 1 and FIG. 2 connected in series with a buck-boost converter, so as to adapt to larger operating voltage ranges. FIG. 3 can be referred to as a two-stage dual active full-bridge series-connected buck-boost converter. FIG. 4 can be referred to as a two-stage LLC-SRC series-connected buck-boost converter. Both FIG. 3 and FIG. 4 belong to the two-stage series-connected converter which will reduce its overall efficiency and increase the cost.

As shown in FIGS. 5A and 5B, adding a push-pull current source to the first-order side of the converter and combining the phase-shifted full bridge of the second-order side may make it becomes a phase-shifted full-bridge converter using a push-pull current source, wherein FIG. 5A shows an aspect of using a snubber as a switch clamp and FIG. 5B shows another aspect of using the active clamp. The circuit of FIG. 5A and FIG. 5B is only suitable for the application having lower voltage on the first-order side, but for the application having high voltage on the first-order side, the circuit design is subject to great restrictions since the voltage across the power switch needs to bear high voltage and therefore the practical application is more difficult.

In other words, since the power conversion of the bidirectional DC-DC power converter requires the variation of high voltage ratio at the input or output ends, a wide range of frequency variations must be provided if a resonant converter is used and therefore the design of the resonant circuit is more difficult and inefficient. Although the addition of buck-boost converter circuit can obtain a wide input voltage range, the known circuit is impossible to use the frequency conversion method to get a quick response and to achieve the seamless of the bidirectional power regulated mode switch. The present invention can solve the aforementioned problems by providing a resonant circuit controlled by a fixed frequency method and combined a buck-boosting conversion circuit.

SUMMARY OF THE INVENTION

It is an objective of the present invention to provide a half-bridge resonant bidirectional DC-DC converter circuit which is a resonant circuit controlled by a fixed frequency method and has the advantages of having wide input voltage range and controllable bidirectional power flow direction.

It is an another objective of the present invention to provide a half-bridge resonant bidirectional DC-DC converter circuit having the seamless of the bidirectional power regulated mode switch, so that the effect of instantaneous operation without power off can be achieved. And the design of the circuit can be simplified because no additional control circuit is required.

In order to achieve the above and other objectives, the present invention provides a half-bridge resonant bidirectional DC-DC converter circuit comprising a half-bridge buck-boost converter and a resonant DC-DC converter.

The half-bridge buck-boost converter comprises a first transistor, a second transistor, an inductor and a first capacitor. The input end of the first transistor is coupled to the positive output end of the external DC power source. The input end of the second transistor is coupled to the negative output end of the external DC power source. The output end of the first transistor is coupled to the output end of the second transistor.

The input end of the inductor is coupled to a first node between the output end of the first transistor and the output end of the second transistor. The input end of the first capacitor is coupled to the output end of the inductor. The output end of the first capacitor is coupled to a second node between the input end of the second transistor and the negative output end of the external DC power source.

The resonant DC-DC converter is coupled to the half-bridge buck-boost converter to act as a later stage circuit of the half-bridge buck-boost converter. The resonant DC-DC converter is adapted to respond to the half-bridge buck-boost converter in a fixed frequency method and output an induced current converted from the input of the half-bridge buck-boost converter.

In an embodiment of the present invention, the resonant DC-DC converter comprises a first-order side switch unit, a voltage conversion unit and a second-order side switch unit. The first-order side switch unit is coupled to the half-bridge buck-boost converter. The voltage conversion unit is coupled to the first-order side switch unit. The second-order side switch unit is coupled to the voltage conversion unit.

In an embodiment of the present invention, the first-order side switch unit comprises a first switch, a second switch, a third switch and a fourth switch. The input end of the first switch is coupled to a third node between the positive end of the first capacitor and the output end of the inductor. The input end of the second switch is coupled to a fourth node between the negative end of the first capacitor and the second node. The output end of the first switch is coupled to the output end of the second switch. The input end of the third switch is coupled to the third node. The input end of the fourth switch is coupled to the fourth node. The output end of the third switch is coupled to the output end of the fourth switch.

In an embodiment of the present invention, the voltage conversion unit comprises a first coil and a second coil. The second coil generates an induced voltage in response to the current flowing into the first coil. The number of turns of the first coil is different from that of the second coil.

In an embodiment of the present invention, the first end of the first coil is coupled to a fifth node between the output end of the first switch and the output end of the second switch. The second end of the first coil is coupled to a sixth node between the output end of the third switch and the output end of the fourth switch.

In an embodiment of the present invention, the second-order side switch unit comprises a fifth switch, a sixth switch, a second capacitor and a third capacitor. The input end of the fifth switch is coupled to the first end of the second coil. The input end of the sixth switch is coupled to the first end of the second coil. The second capacitor is coupled to the second end of the second coil. The third capacitor is coupled to the second end of the second coil. The fifth switch, the sixth switch, the second capacitor and the third capacitor adjust and output the induced voltage.

In an embodiment of the present invention, the half-bridge resonant bidirectional DC-DC converter circuit further comprises a voltage controlled current source which is coupled to the output end of the fifth switch, the output end of the sixth switch, the second capacitor and the third capacitor and outputs the induced current according to the adjusted induced voltage.

In an embodiment of the present invention, the first end of the second coil is coupled to a seventh node between the input end of the fifth switch and the input end of the sixth switch. The second end of the second coil is coupled to an eighth node between the second capacitor and the third capacitor.

In an embodiment of the present invention, the inductor acts as an input current source of the resonant DC-DC converter.

In an embodiment of the present invention, the duty cycle of the changeover switch of the half-bridge buck-boost converter is 50%.

Hence, the half-bridge resonant bidirectional DC-DC converter circuit of the present invention can achieve the effect of a wide input voltage range by the half-bridge buck-boost converter. Furthermore, the half-bridge resonant bidirectional DC-DC converter circuit can achieve the effect of controlling the direction of the bidirectional power flow by the resonant DC-DC converter. Besides, by using the half-bridge buck-boost converter and the resonant DC-DC converter, the effect of instantaneous operation without power off can be achieved and the design of the circuit can be simplified.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 6:
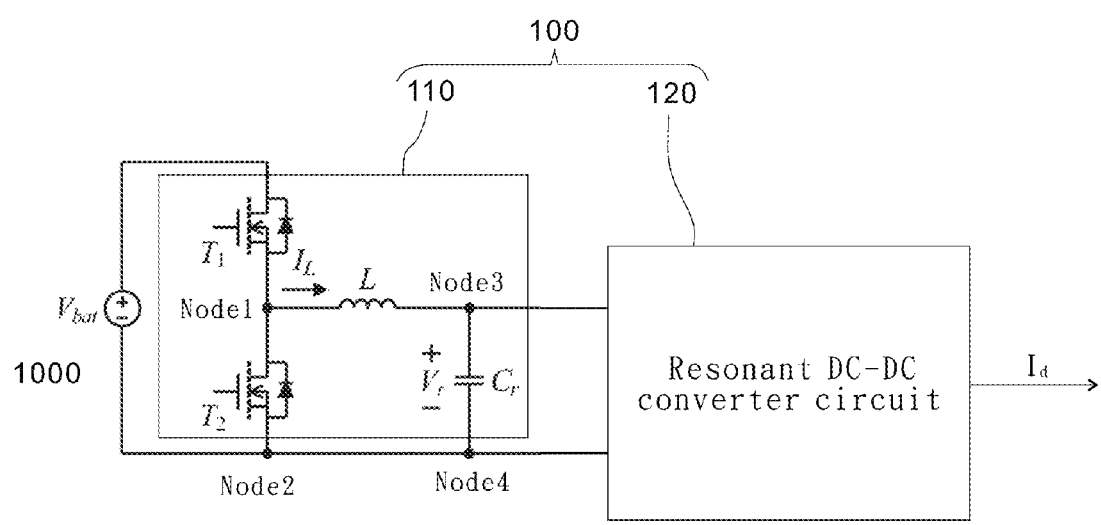
FIG. 6 is a diagram of an embodiment of the half-bridge resonant bidirectional DC-DC converter circuit of the present invention.

Referring to FIG. 6, it is a diagram of an embodiment of the half-bridge resonant bidirectional DC-DC converter circuit 100 of the present invention.

As shown in FIG. 6, the half-bridge resonant bidirectional DC-DC converter circuit 100 comprises a half-bridge buck-boost converter 110 and a resonant DC-DC converter 120. The half-bridge buck-boost converter is coupled to an external DC power source 1000 which provides a stable DC voltage $V_{bat}$. The half-bridge buck-boost converter 110 is used to obtain a wide input voltage range. The resonant DC-DC converter 120 is coupled to the half-bridge buck-boost converter 110 for acting as the later stage circuit of the half-bridge buck-boost converter 110. The resonant DC-DC converter 120 is used to control the direction of the bidirectional power flow. The resonant DC-DC converter 120 responds to the half-bridge buck-boost converter 110 in a fixed frequency method and output an induced current $I_d$ converted from the input of the half-bridge buck-boost converter 110.

The half-bridge buck-boost converter 110 comprises a first transistor T1, a second transistor T2, an inductor L and a first capacitor $C_r$.

The input end of the first transistor T1 is coupled to the positive output end of the external DC power source 1000. The input end of the second transistor T2 is coupled to the negative output end of the external DC power source 1000. The output end of the first transistor T1 is coupled to the output end of the second transistor T2.

The input end of the inductor L is coupled to a first node Node 1 between the output end of the first transistor T1 and the output end of the second transistor T2. The input end of the first capacitor $C_r$ is coupled to the output end of the inductor L. The output end of the first capacitor $C_r$ is coupled to a second node Node 2 between the input end of the second transistor T2 and the negative output end of the external DC power source 1000.

The resonant DC-DC converter 120 comprises a first-order side switch unit 121, a voltage conversion unit 122 and a second-order side switch unit 123. The first-order side switch unit 121 is coupled to the half-bridge buck-boost converter 110. The voltage conversion unit 122 is coupled to the first-order side switch unit 121. The second-order side switch unit 123 is coupled to the voltage conversion unit 122.

Figure 7:
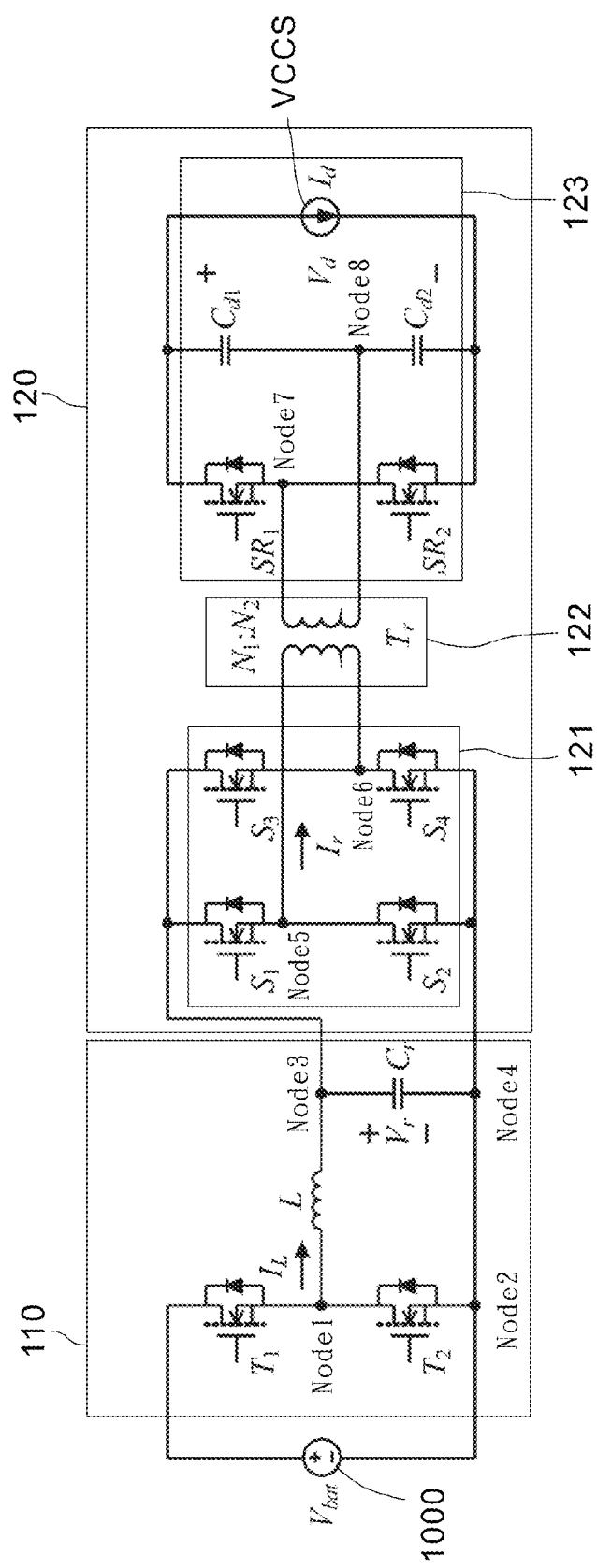
FIG. 7 is a detailed circuit diagram of another embodiment of the half-bridge resonant bidirectional DC-DC converter circuit of the present invention.

Next, referring to FIG. 7, it is a detailed circuit diagram of another embodiment of the half-bridge resonant bidirectional DC-DC converter circuit 100 of the present invention As shown in FIG. 7, the first-order side switch unit 121 may comprise a first switch S1, a second switch S2, a third switch S3 and a fourth switch S4.

The input end of the first switch S1 may couple to a third node Node 3 between the positive end of the first capacitor $C_r$ and the output end of the inductor L. The input end of the second switch S2 may couple to a fourth node Node 4 between the negative end of the first capacitor $C_r$ and the second node Node 2. The output end of the first switch S1 may couple to the output end of the second switch S2.

The input end of the third switch S3 may couple to the third node Node 3. The input end of the fourth switch S4 may couple to the fourth node Node 4. The output end of the third switch S3 may couple to the output end of the fourth switch S4.

Accordingly, the first-order side switch unit 121 may adjust the input of the half-bridge buck-boost converter 110 on the first-order side by the combination of the first to fourth switches S1-S4 and output a current $I_r$.

The voltage conversion unit 122 may comprise a first coil N1 and a second coil N2. The second coil N2 generates an induced voltage $V_d$ in response to the current $I_r$ flowing into the first coil N1. The number of turns of the first coil N1 is different from that of the second coil N2.

Accordingly, the voltage value of the DC voltage can be changed by the induction between the first coil N1 and the second coil N2, and the conversion ratio of the voltage value variation is equal to the turn ratio of the first coil N1 and the second coil N2.

Furthermore, the first end of the first coil N1 may couple to a fifth node Node 5 between the output end of the first switch S1 and the output end of the second switch S2. The second end of the first coil N1 may couple to a sixth node Node 6 between the output end of the third switch S3 and the output end of the fourth switch S4.

The second-order side switch unit 123 may comprise a fifth switch SR1, a sixth switch SR2, a second capacitor $C_{d1}$, a third capacitor $C_{d2}$ and a voltage controlled current source VCCS.

The input end of the fifth switch SR1 is coupled to the first end of the second coil N2. The input end of the sixth switch SR2 is coupled to the first end of the second coil N2. The second capacitor $C_{d1}$ is coupled to the second end of the second coil N2. The third capacitor $C_{d2}$ is coupled to the second end of the second coil N2.

The fifth switch SR1, the sixth switch SR2, the second capacitor $C_{d1}$ and the third capacitor $C_{d2}$ adjust and output the induced voltage $V_d$.

The voltage controlled current source VCCS is coupled to the output end of the fifth switch SR1, the output end of the sixth switch SR2, the second capacitor $C_{d1}$ and the third capacitor $C_{d2}$ and outputs the induced current $I_d$ according to the adjusted induced voltage $V_d$.

Accordingly, by the combination of the fifth switch SR1, the sixth switch SR2, the second capacitor $C_{d1}$, and the third capacitor $C_{d2}$, the second-order side switch unit 123 may adjust and output the induced voltage $V_d$ on the second-order side and may output the induced current $I_d$ by the voltage controlled current source VCCS according to the adjusted induced voltage.

Besides, the first end of the second coil N2 may couple to a seventh node Node 7 between the input end of the fifth switch SR1 and the input end of the sixth switch SR2. The second end of the second coil N2 may couple to an eighth node Node 8 between the second capacitor $C_{d1}$ and the third capacitor $C_{d2}$.

Figure 1:
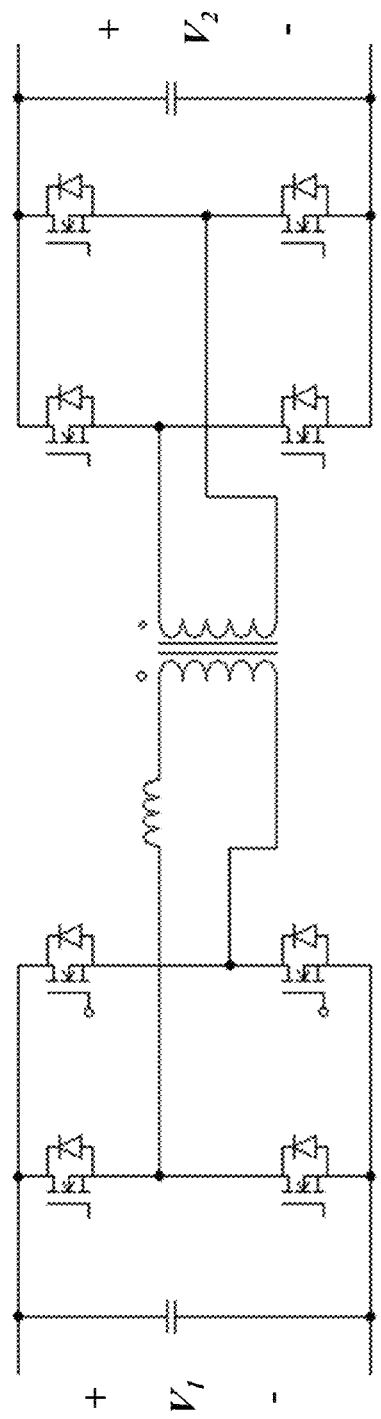
FIG. 1 is a detailed circuit diagram of a conventional dual active full-bridged converter.
Figure 2:
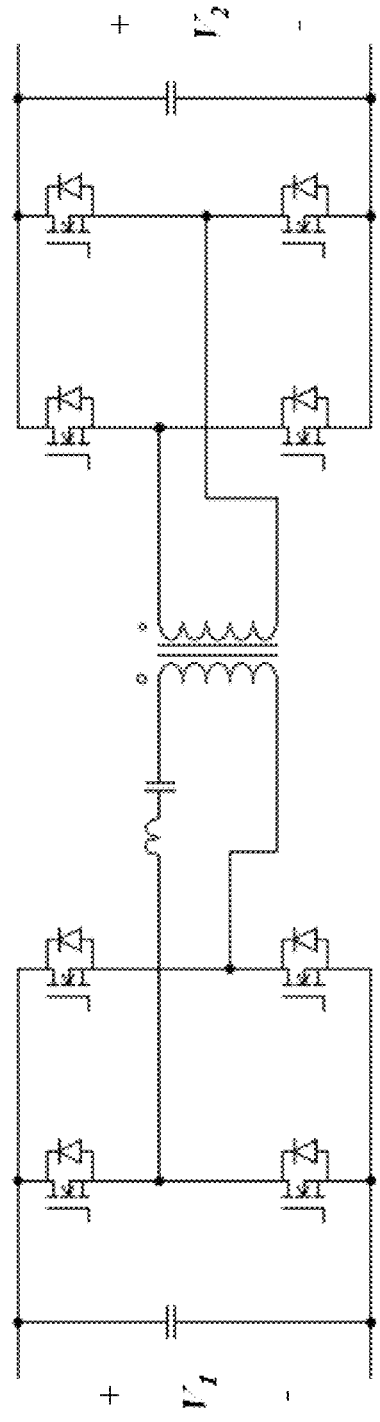
FIG. 2 is a detailed circuit diagram of a conventional LLC-SRC converter.
Figure 3:
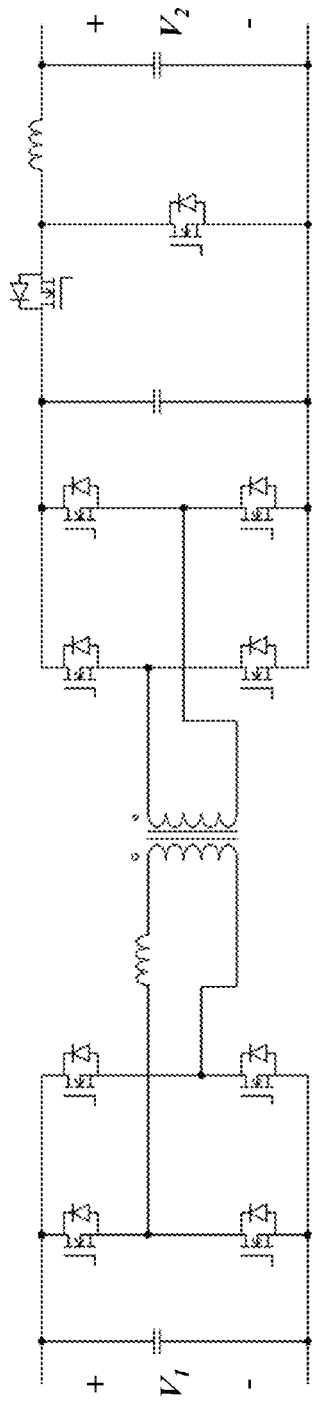
FIG. 3 is a detailed circuit diagram of a first aspect of a conventional two-stage series-connected converter.
Figure 4:
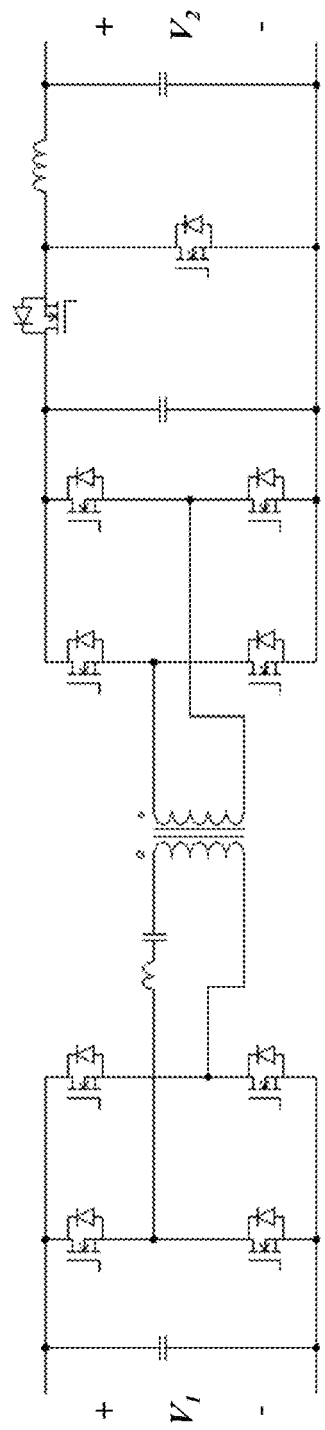
FIG. 4 is a detailed circuit diagram of a second aspect of the conventional two-stage series-connected converter.

The inductor L may act as an input current source of the resonant DC-DC converter 120. Compared with the conventional LLC-SRC converter using frequency conversion control method as shown in FIG. 2, the half-bridge resonant bidirectional DC-DC converter circuit 100 of the present invention uses a fixed frequency control method and therefore does not have the shortcoming like the LLC-SRC converter that the frequency variation range will increase with the increase of the operating voltage.

Figure 5A:
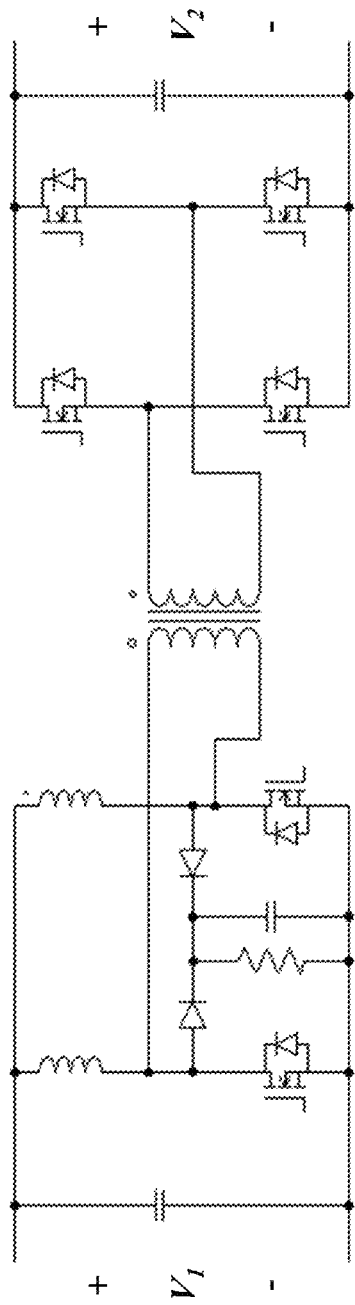
FIG. 5A is a detailed circuit diagram of a first aspect of a conventional phase-shifted full-bridge converter using a push-pull current source.
Figure 5B:
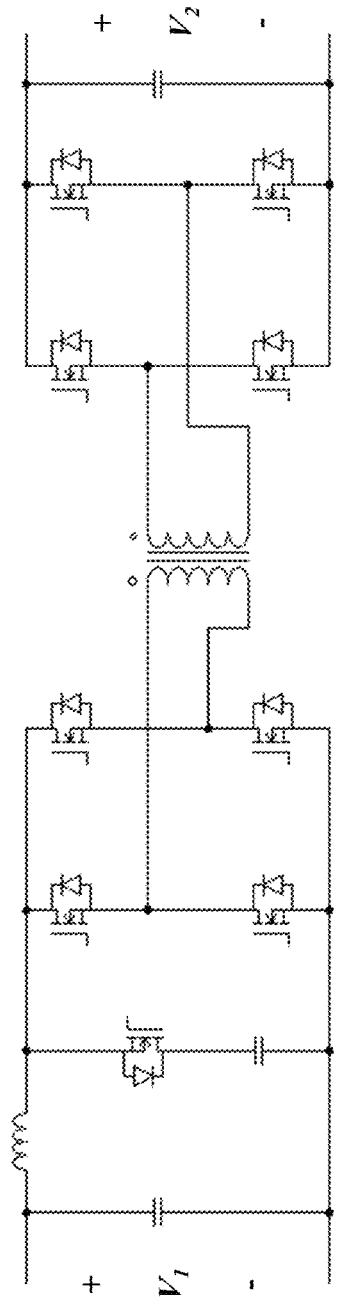
FIG. 5B is a detailed circuit diagram of a second aspect of a conventional phase-shifted full-bridge converter using a push-pull current source.

Compared with the phase-shifted full-bridge converter using push-pull current source as shown in FIG. 5A and FIG. 5B, the first-order side switch unit 121 of the half-bridge resonant bidirectional DC-DC converter circuit 100 of the present invention can use the power elements with lower withstanding voltage specification and therefore may lower the circuit design constraints and the difficulty of the practical application.

Hereinafter, the theoretical basis of the half-bridge resonant bidirectional DC-DC converter circuit 100 of the present invention shown in FIG. 7 will be described by the equivalent circuit.

Figure 8A:
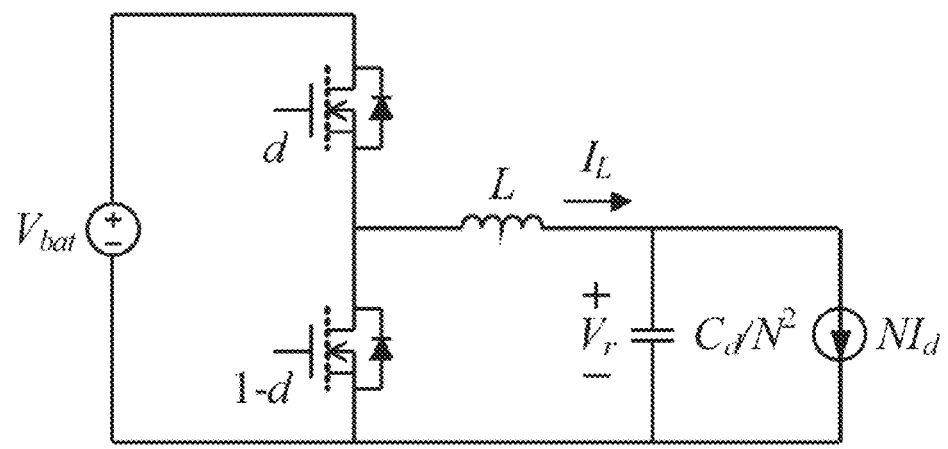
FIG. 8A is a diagram of an equivalent circuit.

Referring to FIG. 8A, it shows an aspect of the equivalent circuit of FIG. 7.

By the equivalent circuit of FIG. 8A and the state-space average method can obtain $$L\frac{dI_L}{dt} = dV_{bat} - V_r. \tag{1}$$

Ignore the variation of $V_{bat}$ and $V_r$ in equation (1) can obtain $$\frac{\tilde{i}_L}{\tilde{d}} = \frac{V_{bat}}{sL}. \tag{2}$$

Consider the current sense ratio $K_s$ and PWM gain can obtain $$H_i(s) = \frac{\tilde{i}_L K_s}{\tilde{V}_{con}} = \frac{\tilde{i}_L K_s}{\tilde{d}V_t} = \frac{K_s V_{bat}}{sLV_t}. \tag{3}$$

Figure 8B:
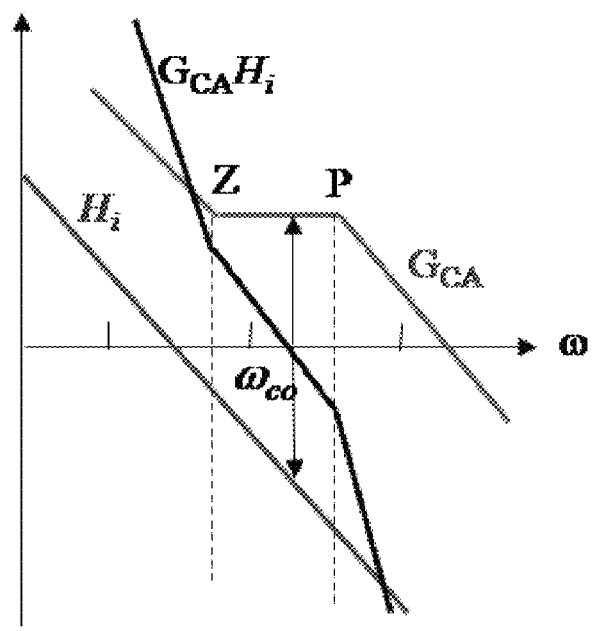
FIG. 8B is a Bode plot of the current control loop of FIG. 8A.

A first-order system current error amplifier ($G_{CA}$) design can be designed using a two-kind error amplifier. The Bode plot of the current controlled loop is shown in FIG. 8B. Since the controlled voltage of PWM is limited to cross the sawtooth wave signal once in a period, the maximum bandwidth ($\omega_{co}$) of the current loop is limited by that the rising slope of $V_{con}$ is less than that of the PWM sawtooth wave ($V_t$). The rising slope of $V_{con}$ is determined by the descending slope of the induced inductor current amplified by the gain $G_{CA}$. By the above limitation can obtain $$(V_r/L)K_s G_{CA,max}(\omega_{co}) = V f_s. \tag{4}$$

Rearrange equation (4) can obtain $$G_{CA,max}(\omega_{co}) = \frac{\tilde{V}_{con}}{K_s \tilde{I}_L} = \frac{V_t f_s L}{V_r K_s}. \quad (5)$$

By equation (3) and equation (5) and use $G_{CA,max}(\omega_{co})$ $H_t(\omega_{co})=1$ can obtain $$\frac{V_t f_s L}{V_r K_s} \frac{K_s V_{bat}}{\omega_{co} L V_t} = 1. \quad (6)$$

Rearrange equation (6) can obtain $$\omega_{co,max} = \frac{V_{bat} f_s}{V_r} \text{ (rad/s)} \quad (7)$$

and $$f_{co,max} = \frac{f_s}{2\pi D}. \quad (8)$$

According to equation (8), if it is designed with the limitation of the rising slope of the controlled voltage $V_{con}$, the theoretical maximum current loop bandwidth may be higher than or close to the switching frequency. Therefore the limitation of the rising slope of the controlled voltage $V_{con}$ cannot be used. Generally, the bandwidth ($\omega_{co}$) can be set to one-fourth to one-eighth of the switching frequency. When the bandwidth ($\omega_{co}$) is chosen, the K-factor method can be used to make the two-kind error amplifier $z=\omega_{co}/K$, $p=\omega_{co}/K$.

Figure 9A:
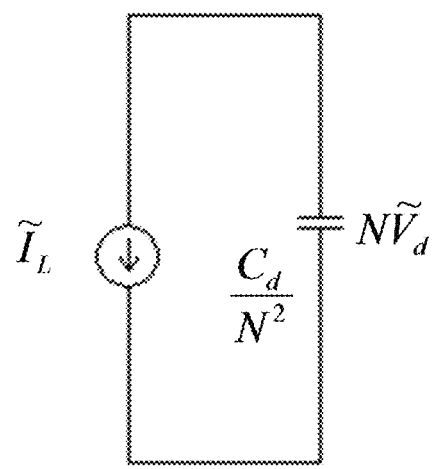
FIG. 9A is a diagram of an equivalent circuit.

When the output voltage of the half-bridge resonant bidirectional DC-DC converter is maintained by the buck-boost converter, the equivalent circuit of FIG. 9A can be used for the resonant circuit analysis, wherein the buck-boost converter is represented by a current source, the average voltage ($V_r$) is the voltage on the low side reflected from the voltage on the high voltage side through the transformer, where $$V_r = \frac{N_1}{N_2} V_d = N V_d. \quad (9)$$

By the input side of the buck-boost converter to obtain $$(C_d/N)\frac{dV_d}{dt} = I_L - NI_d. \quad (10)$$

When consider the voltage sense ratio $K_v$ and use equation (10), the small-signal modeling of the voltage loop can be obtained as follows $$H_v(s) = \frac{K_v \tilde{V}_d}{\tilde{I}_L} = \frac{-NK_v}{sC_d}. \quad (11)$$

Figure 9B:
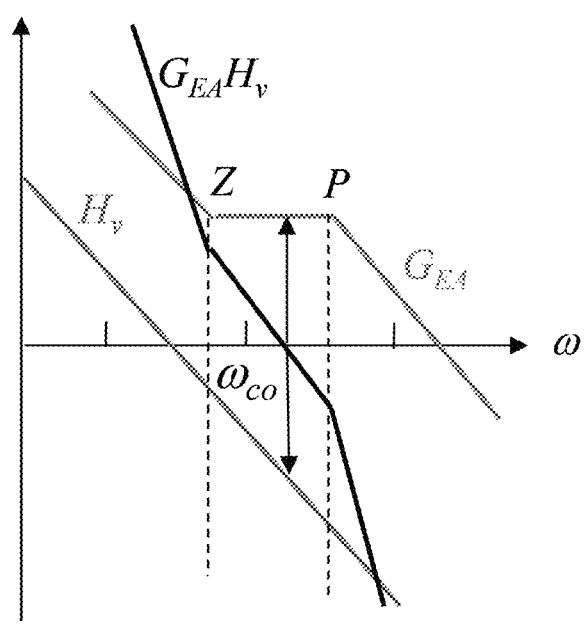
FIG. 9B is a Bode plot of the current control loop of FIG. 9A.

A first-order system voltage error amplifier ($G_{EA}$) design can be designed using a two-kind error amplifier. The Bode plot of the voltage controlled loop is shown in FIG. 9B. Since its bandwidth is limited by the secondary ripple of the DC link, it can be designed at 20 Hz to allow the current command $I_{LC}$ to have a lower secondary ripple.

Figure 10A:
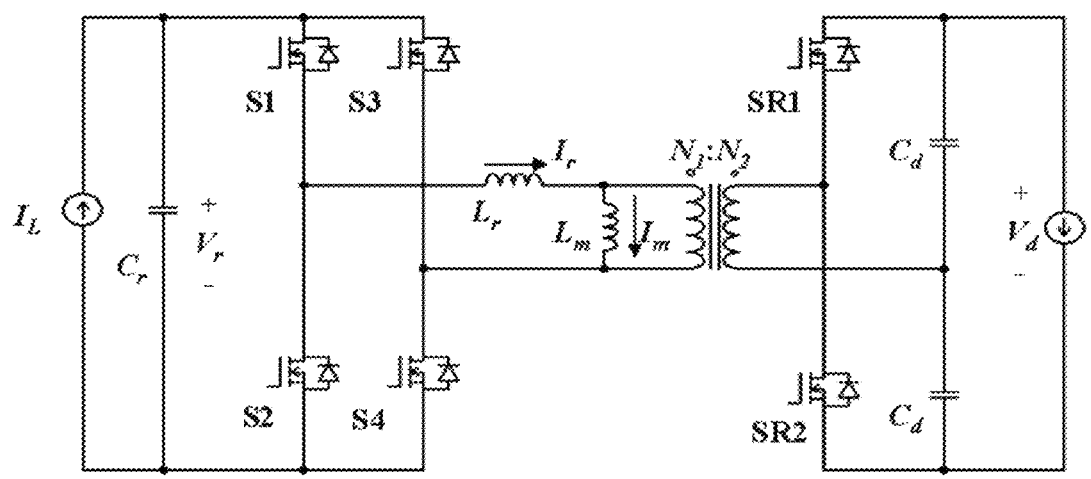
FIG. 10A is a diagram of an equivalent circuit.

If the output voltage can be maintained by a buck-boost converter, the analysis of the half-bridge resonant circuit can be performed using the equivalent circuit of FIG. 10A, wherein the output inverter is represented by a current source, and the input current source is represented by the output current $I_L$ of the buck-boost converter. The average voltage $V_r$ is the voltage on the low side reflected from the voltage on the high voltage side through the transformer, where $$V_r = \frac{N_1}{N_2} V_d. \quad (12)$$

If the output power of the buck-boost converter is $P_o$, then $I_L$ is $$I_L = \frac{P_o}{V_r}. \quad (13)$$

Figure 10B:
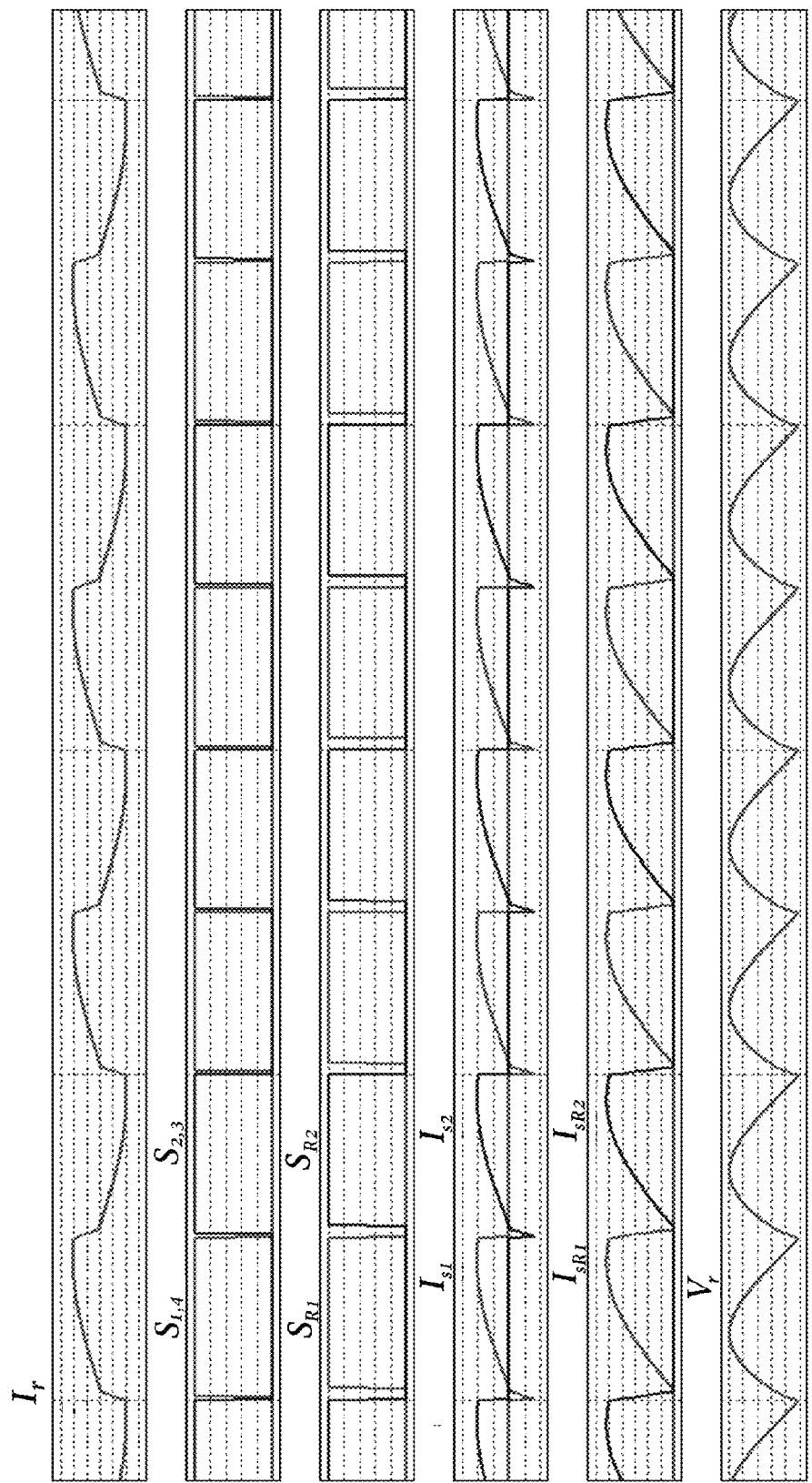
FIG. 10B is a Bode plot of the current control loop of FIG. 10A.

The operation waveform of the circuit is shown in FIG. 10B, and the resonance of the circuit is formed by the leakage inductance $L_r$ of the transformer and the resonance capacitance $C_r$, where the resonant frequency is $$\omega_o = \frac{1}{\sqrt{L_r C_r}}. \quad (14)$$

The resonant impedance is $$Z_o = \sqrt{\frac{L_r}{C_r}}. \quad (15)$$

When the first switch S1, the fifth switch SR1 and the switch SR4 are turned on, the equation of state can be obtained as follows $$C_r \frac{dV_r}{dt} = I_L - I_r, \quad (16)$$

$$L \frac{dI_r}{dt} = V_r - \frac{N_1}{N_2} V_d = V_r - V_b. \quad (17)$$

The rate of rise of the current of the half cycle of the self-induction current $I_m$ is $$\Delta I_m = \frac{V_b}{L_m} \frac{T_s}{2}. \quad (18)$$

Use equation (17) and equation (18) can obtain $$V_r(t) = A \sin \omega_o t + B \cos \omega_o t + V_b, \quad (19)$$

where A and B are the parameters to be determined. Substitute equation (19) into equation (17) can obtain $$I_r(t) = I_L + \omega_o C_r B \sin \omega_o t - \omega_o C_r A \cos \omega_o t. \quad (20)$$

If the switch wants to achieve zero voltage switching and its bypass diodes want to achieve zero current conduction, then $I_r(0)$ should be equal to 0 and the initial $I_r$ in the equation (20) should resonate to a negative value, that is, B<0, and therefore $$I_r(0) = I_L - \omega_o C_r A = 0. \quad (21)$$

By equation (21) can obtain $$A = \frac{I_L}{\omega_o C_r}. \quad (22)$$

Since the charge and discharge of Cr must be balanced, it can be seen that the average value of the half cycle of $V_r(t)$ is equal to $V_b$ in equation (22), where $$\frac{2}{T_s} \int_0^{T_s/2} V_{r(t)} dt = V_b. \quad (23)$$

Substitute equation (22) and equation (23) into equation (19) can obtain $$B = \frac{I_{bf}}{\omega_o C_r} \frac{\left[1 - \cos\left(\pi\left(\frac{f_o}{f_s}\right)\right)\right]}{\sin\left(\pi\left(\frac{f_o}{f_s}\right)\right)}. \quad (24)$$

By equation (24) can obtain the condition of B<0 is $$f_s < f_o, \quad (25)$$

that is, the switching frequency of the switch needs to be lower than the resonance frequency.

Hereinafter, the results of the circuit and control method of the half-bridge resonant bidirectional DC-DC converter circuit 100 of the present invention are verified with reference to an embodiment provided in FIG. 11.

Figure 11:
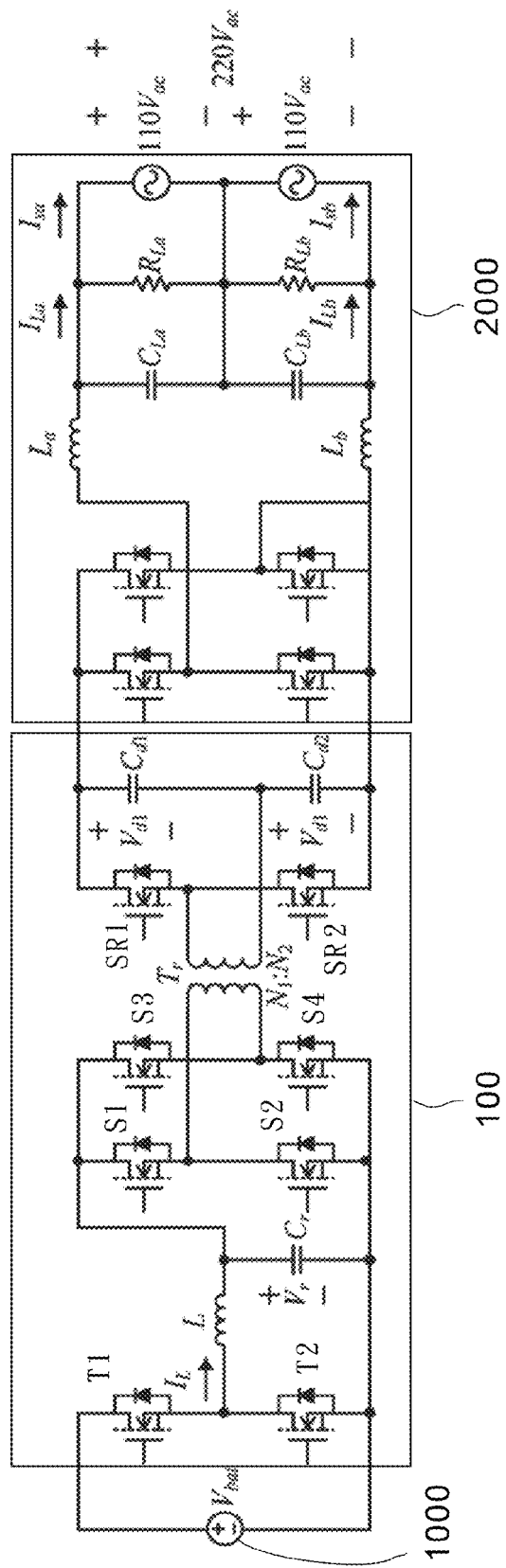
FIG. 11 is a detailed circuit diagram of the half-bridge resonant bidirectional DC-DC converter circuit of the present invention connected in series with a single-phase three-wire inverter at the later stage.
Figure 12A:
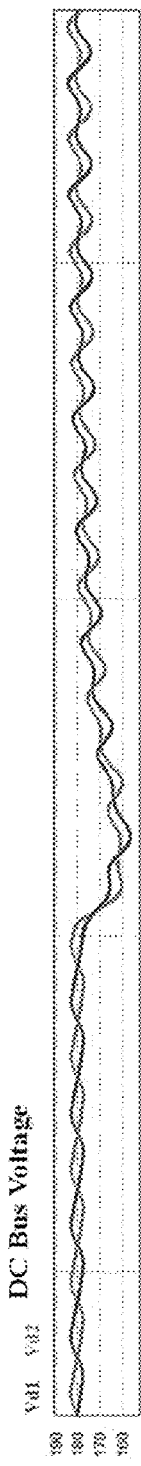
FIG. 12A to 12D are diagrams showing the relationship between the induced current and the controlled current of the half-bridge buck-boost converter of FIG. 11.
Figure 12B:
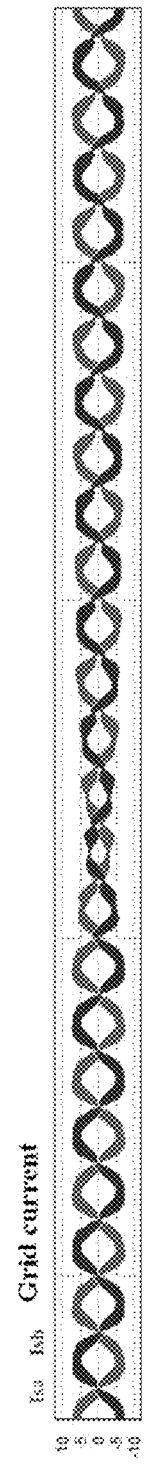
Figure 12C:
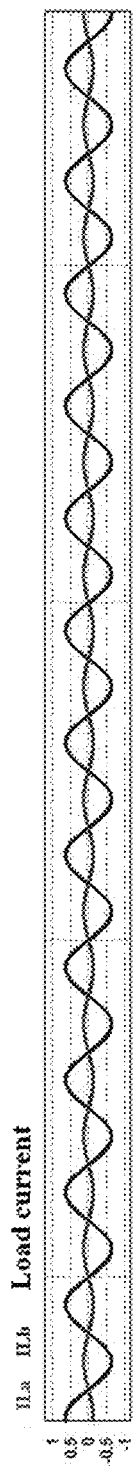
Figure 12D:
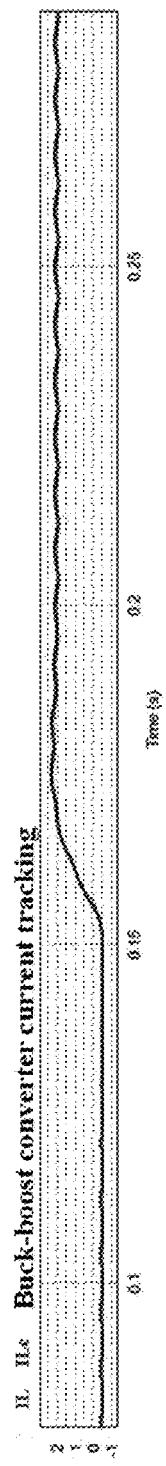

As shown in FIG. 11, the half-bridge resonant bidirectional DC-DC converter circuit 100 of the present invention is connected in series with a single-phase three-wire inverter 2000 which is connected to the supply mains at the later stage. Letting the load of the single-phase three-wire output be unbalanced, the output end 110 Vac/110 Vac/220 Vac of the load are 100 W/500 W/0 W, respectively. As shown in FIG. 12A to FIG. 12D, the supply mains parallel currents $I_{sa}$ and $I_{sb}$ are both stable before t=0.15 s and the bus voltages $V_{d1}$ and $V_{d2}$ on the DC side are both stable, too; the unbalanced load is combined to the load side at t=0.15 s, and the parallel currents $I_{sa}$ and $I_{sb}$ tend to be stable after about 0.02 s, and the load currents $I_{La}$ and $I_{Lb}$ are not affected at all. The inductor current $I_L$ and the controlled current $I_{Lc}$ of the half-bridge buck-boost converter are shown in FIG. 12A to FIG. 12D. Therefore, the circuit provided in the present invention can perform bidirectional power flow control and can perform a seamless operation mode variation and can simultaneously compensate the current of the unbalanced load.

That is, the circuit and control method of the half-bridge resonant bidirectional DC-DC converter circuit 100 of the present invention are simple and efficient and can solve the problem of high boost ratio, high output/input voltage variation and seamless bidirectional power flow switching, etc.

In summary, the half-bridge resonant bidirectional DC-DC converter circuit of the present invention can achieve the effect of a wide input voltage range by the half-bridge buck-boost converter. Furthermore, the half-bridge resonant bidirectional DC-DC converter circuit can achieve the effect of controlling the direction of the bidirectional power flow by the resonant DC-DC converter. Besides, by using the half-bridge buck-boost converter and the resonant DC-DC converter, the effect of instantaneous operation without power off can be achieved and the circuit design can be simplified.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A half-bridge resonant bidirectional DC-DC converter circuit comprising:
    a half-bridge buck-boost converter coupled to an external DC power source which provides a stable DC voltage, the half-bridge buck-boost converter comprising:
        a first transistor, wherein the input end of the first transistor is coupled to the positive output end of the external DC power source;
        a second transistor, wherein the input end of the second transistor is coupled to the negative output end of the external DC power source, the output end of the first transistor is coupled to the output end of the second transistor;
        an inductor, wherein the input end of the inductor is coupled to a first node between the output end of the first transistor and the output end of the second transistor; and
        a first capacitor, wherein the input end of the first capacitor is coupled to the output end of the inductor, the output end of the first capacitor is coupled to a second node between the input end of the second transistor and the negative output end of the external DC power source;
    a resonant DC-DC converter coupled to the half-bridge buck-boost converter to act as a later stage circuit of the half-bridge buck-boost converter, the resonant DC-DC converter is adapted to respond to the half-bridge buck-boost converter in a fixed frequency method and output an induced current converted from the input of the half-bridge buck-boost converter;
    wherein the resonant DC-DC converter comprises a first-order side switch unit, a voltage conversion unit and a second-order side switch unit, the first-order side switch unit coupled to the half-bridge buck-boost converter, the voltage conversion unit coupled to the first-order side switch unit, and the second-order side switch unit coupled to the voltage conversion unit; and wherein the second-order side switch unit comprises a fifth switch, a sixth switch, a second capacitor and a third capacitor, the input end of the fifth switch is coupled to the first end of the second coil, the input end of the sixth switch is coupled to the first end of the second coil, the second capacitor coupled to the second end of the second coil, the third capacitor coupled to the second end of the second coil, and the fifth switch, the sixth switch, the second capacitor and the third capacitor adjust and output the induced voltage.

2. The half-bridge resonant bidirectional DC-DC converter circuit according to claim 1, wherein the duty cycle of the changeover switch of the half-bridge buck-boost converter is 50%.

3. The half-bridge resonant bidirectional DC-DC converter circuit according to claim 1, wherein the first-order side switch unit comprises:
- a first switch, wherein the input end of the first switch is coupled to a third node between the positive end of the first capacitor and the output end of the inductor;
- a second switch, wherein the input end of the second switch is coupled to a fourth node between the negative end of the first capacitor and the second node, the output end of the first switch is coupled to the output end of the second switch;
- a third switch, wherein the input end of the third switch is coupled to the third node; and
- a fourth switch, wherein the input end of the fourth switch is coupled to the fourth node, the output end of the third switch is coupled to the output end of the fourth switch.

4. The half-bridge resonant bidirectional DC-DC converter circuit according to claim 3, wherein the voltage conversion unit comprises:

a first coil; and a second coil generating an induced voltage in response to the current flowing into the first coil, the number of turns of the first coil is different from that of the second coil.

5. The half-bridge resonant bidirectional DC-DC converter circuit according to claim 4, wherein the first end of the first coil is coupled to a fifth node between the output end of the first switch and the output end of the second switch, the second end of the first coil is coupled to a sixth node between the output end of the third switch and the output end of the fourth switch.

6. The half-bridge resonant bidirectional DC-DC converter circuit according to claim 1, wherein the inductor acts as an input current source of the resonant DC-DC converter.

7. The half-bridge resonant bidirectional DC-DC converter circuit according to claim 1, further comprising a voltage controlled current source which is coupled to the output end of the fifth switch, the output end of the sixth switch, the second capacitor and the third capacitor and outputs the induced current according to the adjusted induced voltage.

8. The half-bridge resonant bidirectional DC-DC converter circuit according to claim 1, wherein the first end of the second coil is coupled to a seventh node between the input end of the fifth switch and the input end of the sixth switch, the second end of the second coil is coupled to an eighth node between the second capacitor and the third capacitor.

* * * * *